F. I. JOHNSON.
RESILIENT TIRE FOR VEHICLES.
APPLICATION FILED NOV. 2, 1914. RENEWED MAR. 25, 1918.
1,282,428. Patented Oct. 22, 1918.
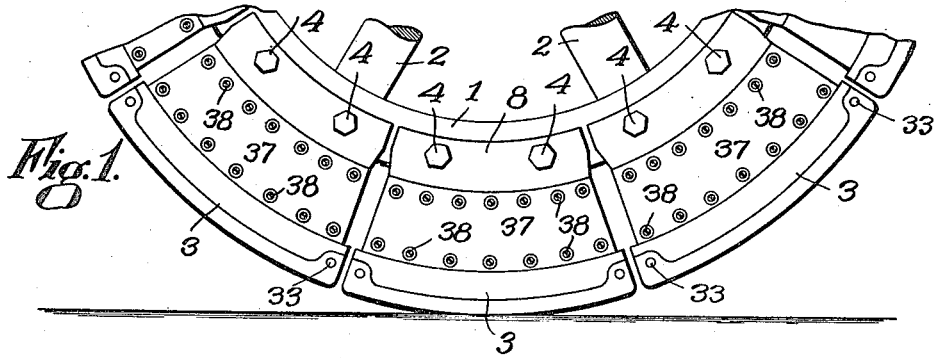
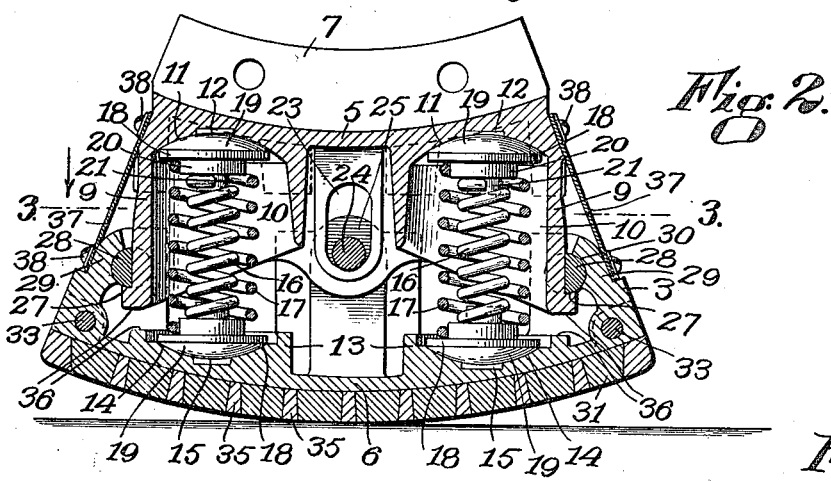
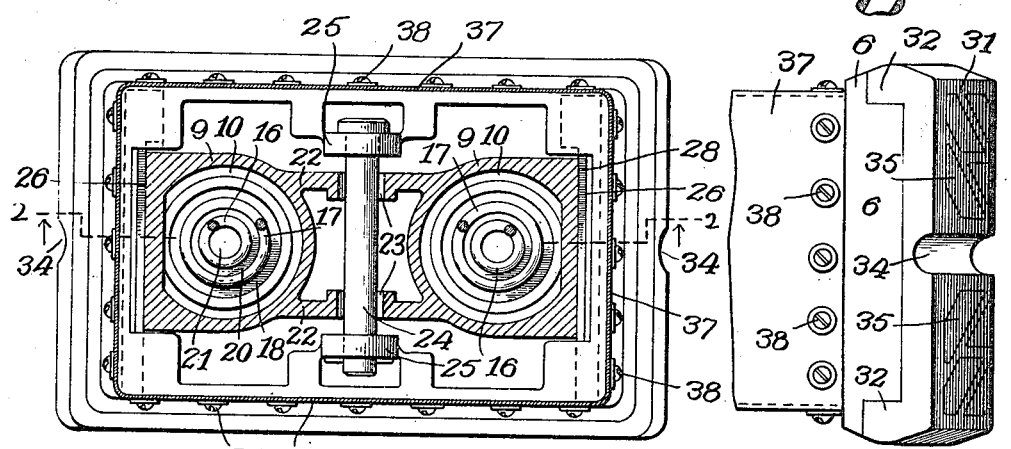
Witnesses.
R. D. Tolman.
Penelope Comberbach.
Inventor.
Frederic Iver Johnson
By Fowler & Kennedy
Attorneys.

UNITED STATES PATENT OFFICE.

FREDERIC IVER JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

RESILIENT TIRE FOR VEHICLES.

1,282,428.      Specification of Letters Patent.      Patented Oct. 22, 1918.

Application filed November 2, 1914, Serial No. 869,798. Renewed March 25, 1918. Serial No. 224,654.

*To all whom it may concern:*

Be it known that I, FREDERIC IVER JOHNSON, a citizen of the United States, residing at Fitchburg, in the county of Worcester and Commonwealth of Massachusetts, have invented a new and useful Improvement in Resilient Tires for Vehicles, of which the following is a specification, accompanied by drawings forming a part of the same.

The object of my invention is to provide a resilient or cushioned tire for vehicles which is puncture proof and capable of withstanding the hard usage of heavily loaded vehicles, such as motor trucks, without the use of inflated tubes. Wheel tires embodying my invention are capable of being employed upon vehicles of various kinds, but are especially adapted for automobiles which are subjected to strains resulting from their weight, speed and the irregularities of the road. This object, among others, I accomplish by inclosing a rigid rim by a series of collapsible sections which are held in their normal or expanded position by coiled springs, as hereinafter described, the novel features of construction being pointed out in the annexed claims.

In the accompanying drawings which represent a practical embodiment of my invention, Figure 1 is a side view of a portion of a wheel rim having three collapsible sections.

Fig. 2 is a central longitudinal sectional view of a collapsible section on the plane of line 2—2, Fig. 3.

Fig. 3 is a longitudinal sectional view on the plane of the broken line 3—3, Fig. 2, and Fig. 4 is an end view of the tread plate.

Similar characters refer to similar parts in the different figures.

The collapsible sections of the resilient tire, which form the subject of my present invention, are attached to the rigid rim of a vehicle wheel. Referring to Fig. 1, 1 denotes the rigid rim of the wheel and 2, 2 portions of the spokes, to the ends of which, in the present instance, the rim of the wheel is attached. To the rigid rim 1, I attach my improved tire, consisting of separated sections 3 attached to the rim 1 by bolts 4. The sections 3 are duplicates of each other and a description of one will, therefore, suffice. Each of the sections 3 comprises a rim plate 5 and a tread plate 6. The rim plate 5 is provided with flanges 7 and 8 which inclose the sides of the rigid rim 1, with the curved rim plate 5 lying against the outer periphery of the wheel rim 1. The rim plate 5 is provided with a pair of hollow bosses 9, 9 forming chambers 10, 10 having their end walls presenting concave surfaces 11, 11. The concave surfaces 11, 11 are provided with central recesses 12, 12 for the reception of grease, in order to lubricate the surfaces 11. The tread plate 6 is provided with bosses 13, opposing the bosses 9, and provided with concave surfaces 14 having concentric recesses 15 which likewise serve as grease receptacles for the lubrication of the concave surfaces 14.

Between the concave surfaces 11 and 14 I interpose coiled springs arranged in pairs, each pair consisting of an inner spring 16 and an outer spring 17. Upon the ends of the springs 16 and 17 I mount the heads 18, having their outer surfaces 19 convex and fitting the concave surfaces 11 and 14. The heads 18 are provided with concentric bosses 20 and 21, having different diameters and fitting the ends of the springs 17 and 16, by which the latter are separated and held in concentric relation to each other. The bosses 9, 9 are connected by webs 22, 22 having slots 23 through which passes a pin 24 held in lugs 25, 25 extending inwardly from the tread plate 6, thereby limiting the separation of the plates 5 and 6 as they are pressed apart by the expansion of the coiled springs, but allowing the two plates to approach each other under the weight of the load. The bosses 9 are segmental in cross section and are provided upon their outer sides with flat sides 26. The flat sides 26 are provided at their lower edges with shoulders 27 which engage the lower edges of the semicircular pins 28. The pins 28 are held in a flange 29 of the tread plate 6. The flanges 29 inclose the free ends of the bosses 9, 9. The flat sides 26 of the bosses 9, 9 press against the flat sides of the semicircular pins 28, while the convex side of the pins 28 fits a semicircular recess 30 in the flange 29. The shoulders 27 engage the edges of the pins 28, and limit the separation of the rim plate 5 and the tread plate 6 as they are acted upon by the expansion of the coiled springs.

Upon the outer surface of the tread plate 6 I place a shoe 31, consisting of a cast metal plate having at each corner an upwardly projecting ear 32 fitting a recess in the corner of the tread plate 6. The shoe 31 is attached to the tread plate 6 by means of pins 33 passing through the ears 32 and the tread plate 6. The shoe 31 is preferably provided at its center with a semicircular recess 34 extending lengthwise the shoe, which is intended to prevent skidding of the wheel by the engagement of the sharp corners of the recess 34 with the roadway. I also increase the traction of the shoe 31 by inserting at intervals blocks 35 of some softer metal.

In operation the plates 5 and 6 and springs 16 and 17 may be subjected to any variety of compressing strains incident to the use of the vehicle, allowing the ends or sides of the tread plate 6 to be independently crowded toward the center of the wheel as the two plates are capable of a relatively rocking motion both longitudinally and transversely. The action of the coiled springs is not restrained by any unsymmetrical compression of the resilient section, as the coils of the springs are capable of being flexed in either direction and the heads 18 are also capable of a slight rocking movement upon the concave lubricated surfaces 11 and 14. By my improved construction I avoid any cramping of the movable parts of the resilient section, thereby securing the utmost freedom of movement and the maximum resiliency of the coiled springs. In the position of the parts as shown in Fig. 2, the opposing surfaces 36 of the ends of the bosses 9 and 13 are separated by a limited space, which allows the surfaces 36 to contact and serve as stops to limit the approach of the rim plate and tire plate toward each other before the limit of elasticity of the coiled springs has been reached. By means of these stops I prevent any compression of the coiled springs sufficient to set them, thereby preserving the efficiency of the springs almost indefinitely.

The strain incident to the rotation of the wheel is communicated from the rim 1 of the wheel to the rim plate 5, and from the rim plate 5 it is communicated to the tread plate 6 through the flat sides 26 of the bosses 9 pressing against the flat sides of the pins 28 which are held in the concave recesses 30 of the flanged tire plate. When the parts of the resilient section are normally separated, as shown in Fig. 2, the opening between them is closed by means of a flexible band 37, of rubber or leather, which is attached at its edges by screws 38 to each part of the section.

I claim,

1. A resilient tire for vehicles having a series of separated sections, each of said sections comprising a rim plate and a tread plate and intervening coiled springs with their tensions applied to separate said plates, convex heads carried by the opposite ends of said springs having bosses inclosed by the end coils of said springs, concave seats in the rim plates, and tread plates for said heads, said seats having recesses for lubricant.

2. In a resilient tire for vehicles composed of separated sections, each of said sections having a rim plate and a tread plate with intervening coiled springs, a pair of hollow segmental bosses projecting from said rim plate having concave end walls, and forming chambers for said springs, said segmental bosses having flat outer walls, flanges on said tread plate overlapping said outer walls, and interposed segmental pins contacting with said flanges and said bosses.

3. In a resilient tire for vehicles, comprising separated sections each having a rim plate and a tread plate and intervening coiled springs, a pair of hollow segmental bosses projecting from said rim plate, said bosses having flat outer walls provided with a projecting shoulder, flanges on said tread plate overlapping the ends of said bosses, and semicircular pins held by said flanges and contacting with the flat sides of said pins.

4. In a resilient tire for vehicles, a rim plate, a tread plate, intervening coiled springs, flat walls projecting from the ends of said rim plate, flanges projecting from the ends of said tread plate and overlapping the ends of said flat walls, and segmental pins interposed between said walls and said flanges, whereby the rotative movement of said rim plate is imparted to said tread plate.

5. In a resilient tire for vehicles, comprising a rim portion and a tread portion and intervening springs with their tension applied to separate said portions, shoulders on one of said portions, and removable segmental pins held in the other portion and engaging said shoulders to limit the separation of said portions.

FREDERIC IVER JOHNSON.

Witnesses:
Geo. H. Kennedy, Jr.,
Penelope Comberbach.

Copies of this patent may be obtained for five cents each, by addressing the "Commissioner of Patents, Washington, D. C."